(12) United States Patent
Ishida et al.

(10) Patent No.: US 8,175,211 B2
(45) Date of Patent: May 8, 2012

(54) METHOD OF STRESS CORROSION CRACKING MITIGATION FOR NUCLEAR POWER PLANT STRUCTURAL MATERIALS

(75) Inventors: Kazushige Ishida, Hitachi (JP); Yoichi Wada, Hitachinaka (JP); Makoto Nagase, Mito (JP); Masahiko Tachibana, Hitachi (JP); Masao Endo, Kitaibaraki (JP); Motomasa Fuse, Hitachinaka (JP); Naoshi Usui, Tsuchiura (JP); Motohiro Aizawa, Hitachi (JP)

(73) Assignee: Hitachi-Ge Nuclear Energy, Ltd., Ibaraki (JP)

( * ) Notice: Subject to any disclaimer, the term of this patent is extended or adjusted under 35 U.S.C. 154(b) by 33 days.

(21) Appl. No.: 12/213,316

(22) Filed: Jun. 18, 2008

(65) Prior Publication Data

US 2008/0292042 A1 Nov. 27, 2008

Related U.S. Application Data

(62) Division of application No. 10/896,092, filed on Jul. 22, 2004, now abandoned.

(30) Foreign Application Priority Data

Jul. 22, 2003 (JP) ................................ 2003-199572

(51) Int. Cl.
*G21C 9/00* (2006.01)
(52) U.S. Cl. ...................................... 376/305; 376/306
(58) Field of Classification Search .................. 376/305, 376/306
See application file for complete search history.

(56) References Cited

U.S. PATENT DOCUMENTS

| 3,294,644 | A | * | 12/1966 | Gilbert ........................... 376/306 |
| 4,376,753 | A | | 3/1983 | Lucas |
| 5,084,235 | A | * | 1/1992 | Ibe et al. ........................ 376/306 |
| 5,135,709 | A | | 8/1992 | Andresen et al. |
| 5,164,152 | A | | 11/1992 | Kim et al. |
| 5,398,268 | A | * | 3/1995 | Ibe et al. ........................ 376/305 |
| 5,448,605 | A | | 9/1995 | Hettiarachchi |
| 5,600,692 | A | | 2/1997 | Hettiarachchi |
| 6,724,854 | B1 | | 4/2004 | Kim et al. |
| 6,793,883 | B2 | * | 9/2004 | Andresen et al. ................. 422/7 |
| 2002/0080906 | A1 | | 6/2002 | Andresen et al. |
| 2002/0118787 | A1 | | 8/2002 | Andresen et al. |
| 2003/0012686 | A1 | | 1/2003 | Andresen et al. |

FOREIGN PATENT DOCUMENTS

| JP | 07-209487 | 8/1995 |
| JP | 08327786 | 12/1996 |
| JP | 2766422 | 4/1998 |
| JP | 2001525494 | 12/2001 |
| JP | 2002236191 | 8/2002 |
| WO | 99285537 | 6/1999 |

* cited by examiner

*Primary Examiner* — Ricardo Palabrica
(74) *Attorney, Agent, or Firm* — Brundidge & Stanger, P.C.

(57) ABSTRACT

The object of this invention is to provide a method for mitigating a stress corrosion cracking of reactor structural material which makes it possible to suppress the rise in the main steam line dose rate without secondary effects such as a rise in the concentration of radioactive cobalt-60, etc. in the reactor water. Hydrogen and a reductive nitrogen compound containing nitrogen having a negative oxidation number (for example, hydrazine) are injected into the core water of boiling water nuclear power plant. By injecting the reductive nitrogen compound containing nitrogen having a negative oxidation number into the core water, the stress corrosion cracking of structural material of reactor can be mitigated without side reactions such as a rise in the concentration of cobalt-60, etc.

5 Claims, 12 Drawing Sheets

METHOD OF STRESS CORROSION CRACKING MITIGATION FOR NUCLEAR POWER PLANT STRUCTURAL MATERIALS

The present application is a Divisional Application of application Ser. No. 10/896,092, filed Jul. 22, 2004 now abandoned, the contents of which are incorporated herein by reference.

FIELD OF THE INVENTION

This invention relates to a technique for a preventive maintenance of boiling water nuclear power plant (hereinafter, referred to as "BWR"), and particularly to a method for mitigating a stress corrosion cracking (hereinafter, referred to as "SCC") of nuclear power plant structural materials.

BACKGROUND OF THE INVENTION

In BWR, it is an important problem to suppress the SCC of the materials constructing the core structures and pressure boundaries (stainless steel, nickel-base alloys) from the viewpoint of improving the plant operating rate. SCC takes place when the three factors (materials, stress, environment) fall on one another. Accordingly, SCC can be mitigated by mitigating at least one of the three factors.

When a plant is operated, the core cooling water is radioactively decomposed by the intense gamma and neutron rays emitted from the core. As its result, the structural materials constructing the in-core structures and pressure boundaries come to be exposed to the core cooling water containing oxygen and hydrogen peroxide (both are the products of radiolysis) in an amount of several hundreds ppb and having a high temperature (in this invention, a temperature of 100° C. or more is referred to as high temperature; and the outlet temperature of core is 288° C. at the time of normal power operation). FIG. 2 illustrates the relation between crack growth rate (hereinafter, referred to as "CGR") and electrochemical corrosion potential (hereinafter, referred to as "ECP"). It is apparent from FIG. 2 that CGR decreases when ECP drops. FIG. 3 illustrates the results of measurement on the relation between the concentrations of oxygen and hydrogen peroxide and ECP of type 304 stainless steel (hereinafter, referred to as "304SS") in high-temperature water. Both oxygen and hydrogen peroxide show a higher ECP at a higher concentration. Accordingly, for mitigating SCC of structural materials exposed to the cooling water of reactor, it is necessary to reduce ECP, or to lower the concentrations of oxygen and hydrogen peroxide present in the reactor water.

As a technique for solving this problem, the technique of adding hydrogen from the feed water system (hereinafter, referred to as "hydrogen injection") can be referred to. Hydrogen injection is a technique of reacting the injected hydrogen with the oxygen and hydrogen peroxide formed by the radiolysis of water to return them to water, and thereby decreasing the concentrations of oxygen and hydrogen peroxide in the reactor water. If the hydrogen injection is carried out, however, radioactive nitrogen 16 (hereinafter, referred to as "N-16") formed by the radio-activation of water becomes readily migrating together with steam, and this N-16 enhances the dose rate of turbine building. FIG. 4 illustrates the relation between the concentration of hydrogen in the fed water and effective oxygen concentration ((oxygen concentration)+0.5×(hydrogen peroxide concentration)) and the relation between the concentration of hydrogen in the feed water and the relative value of main steam line dose rate. It is apparent from FIG. 4 that an increase in hydrogen concentration in the feed water brings about a rise in the relative value of main steam line dose rate, though it causes a decrease in the effective oxygen concentration.

For solving this problem, a technique of making an element of the platinum group adhere to the surface of material and thereby accelerating the reaction between hydrogen and oxygen and hydrogen peroxide (for example, see: (1) JP Patent No. 2766422). By this technique, ECP can be decreased while suppressing the rise in the main steam line dose rate.

SUMMARY OF THE INVENTION

If an element of the platinum group is made to adhere to the surface of a material in order to accelerate the reaction between hydrogen and oxygen and hydrogen peroxide, however, there arises a new problem that the concentration of radioactive cobalt Co-60 in the cooling water for the reactor rises.

It is an object of this invention to provide a method for mitigating the stress corrosion cracking of reactor structural materials by which the rise in the main steam line dose rate can be suppressed without side reactions such as the elevation of radioactive cobalt Co-60 concentration in the cooling water of the reactor.

A reductive nitrogen compound containing nitrogen having a negative oxidation number is injected into the reactor water of a boiling water nuclear power plant. By injecting a reductive nitrogen compound containing nitrogen having a negative oxidation number into the reactor water, the stress corrosion cracking of the structural material of the reactor can be mitigated without secondary effects such as the elevation of cobalt 60 (Co-60) concentration.

Other objects, features and advantages of the invention will become apparent from the following description of the embodiments of the invention taken in conjunction with the accompanying drawings.

EXPLANATION OF THE MARKS

3 - - - Filter demineralizer for condensate;
5 - - - Feed water heating system;
6 - - - Feed water line;
8 - - - Bottom drain line;
10 - - - Reactor water clean up system line;
12 - - - Reactor water filter demineralizer;
16 - - - Primary loop re-circulation system line.

DETAILED DESCRIPTION OF THE INVENTION

Figure 4:
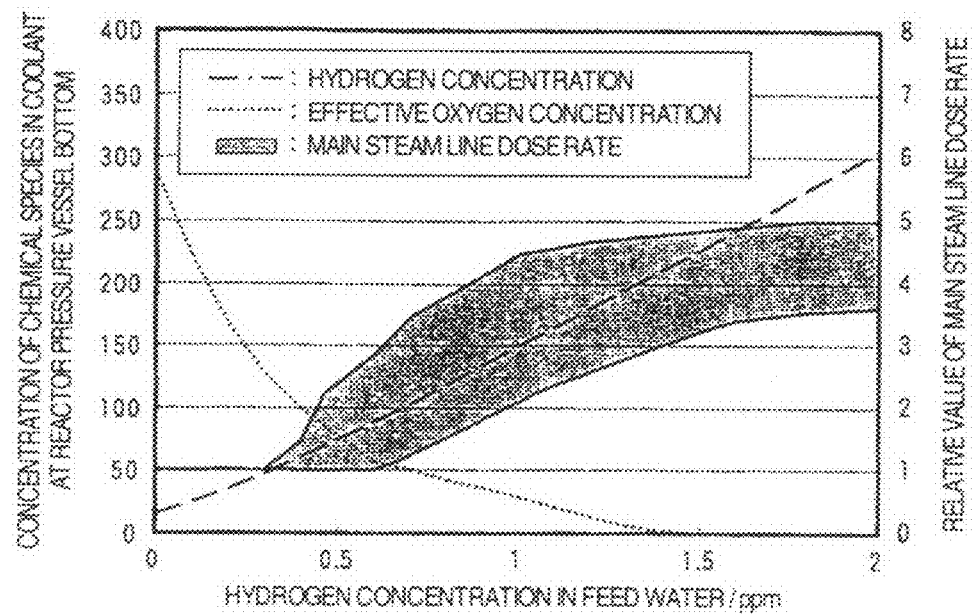
FIG. 4 is a graph illustrating the relations between hydrogen concentration in the feed water and effective oxygen concentration, hydrogen concentration and relative value of main steam line dose rate.

Elevation of the main steam line dose rate is dependent on the hydrogen concentration in the reactor water. The decreasing effect of the effective oxygen concentration in the reactor pressure vessel bottom water on the hydrogen concentration in the fed water is dependent on the designed conditions of the plant. As shown in FIG. 4, however, the hydrogen concentration in the fed water at which the main steam line dose rate begins to rise is not greatly dependent on the kind of plant, and stays at about 0.4 ppm. This is for the reason that most of the boiling water type reactors are so designed that the ratio of flow rate of feed water to flow rate in the core (average steam quality) comes to about 13%, so that the amount of hydrogen injected into the reactor water is not greatly different from one plant to another so far as the concentration of the feed water is fixed. Accordingly, the chemical reactions participated by N-16 in the core progress roughly under the same conditions, and the change in the main steam line dose rate shows a similar behavior. Accordingly, when a compound decreasing the concentrations of oxygen and hydrogen peroxide in the reactor water without greatly affecting the hydrogen concentration and giving the changes of pH and electro conductivity falling in the standard of control is injected into the reactor water, ECP can be decreased and SCC can be suppressed without causing a rise in the main steam system does rate.

Figure 5:
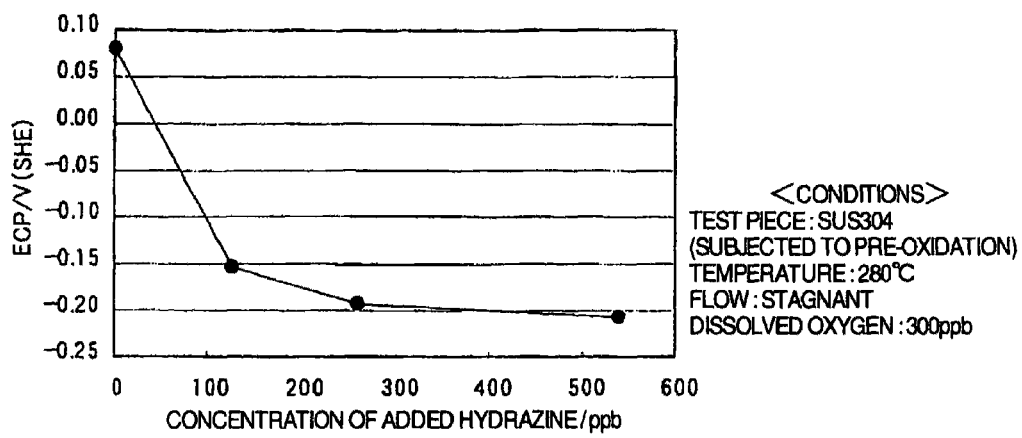
FIG. 5 is a graph illustrating the relation between concentration of added hydrazine and electric chemical corrosion potential.

The present inventors have discovered that nitrogen compounds containing a nitrogen atom having an oxidation number smaller than that in molecular nitrogen, such as hydroxylamine, carbohydrazide, hydrazine, ammonia, diazine and the like, (hereinafter, these nitrogen compounds are referred to as "reductive nitrogen compounds") are reductants satisfying the above-mentioned conditions. As the first reason therefor, it can be mentioned that these compounds decrease ECP of the material by oxidation reduction reactions of the reductive nitrogen compounds themselves, even in the period in which dose rate of the irradiation is small. FIG. 5 illustrates results of measurement of ECP of 304SS in the presence of oxygen in water having a high temperature of 280° C., wherein the injected reductive nitrogen compound is hydrazine. As concentration of hydrazine becomes higher, ECP decreases. If hydrazine consumes oxygen and the decrease in oxygen concentration causes a decrease in ECP, ECP should decrease to −0.5 VvsSHE in the presence of excessive hydrazine. According to the result of actual measurement, nevertheless, there is seen a tendency of saturation at −0.2V (SHE), which is probably attributable to an oxidation reduction reaction of hydrazine. Further, from the results of the measurement, it has become apparent that ECP reaches a saturation when concentration of added hydrazine exceeds a definite value. This means that the time period of the hydrazine-oxygen reaction is in an order of second, in water of high temperature. Accordingly, it can be expected that, even in the case of BWR where it takes a time period of second order from entrance of the water to its arrival at the core, the decrease will show a tendency of saturation. Thus, the inventors have confirmed that ECP can be decreased by injecting a reductive nitrogen compound, and have found that ECP can be decreased economically by placing an upper limit on the amount of injection.

As the second reason, it can be pointed out that a reductive nitrogen compound reduces oxygen and hydrogen peroxide according the (Equation 2) and (Equation 3), when the reductive nitrogen compound is oxidized to form a molecular nitrogen according to (Equation 1). In the time period when the irradiation has a high dose rate, this reaction is accelerated by formation of radials, etc.

$$2N^{-n} - R \rightarrow N_2 + 2ne^- + R^{2n+} \quad \text{(Equation 1)}$$

$$O_2 + 4H_2O + 4e^- \rightarrow 4OH^- \quad \text{(Equation 2)}$$

$$H_2O_2 + 2e^- \rightarrow 2OH^- \quad \text{(Equation 3)}$$

(R designates the residual part of the molecule of reductive organic compound.)

As the reductive organic compound, hydrazine is preferable. This is for the following three reasons.

(1) Hydrazine reacts with oxygen and hydrogen peroxide as expressed by (Equation 4) and (Equation 5) to form nitrogen molecule and water which do not affect pH and conductivity. Accordingly, no release of hydrogen takes place. If the compound contains carbon, carbon dioxide is formed, which forms carbonic acid causing subsidiary effects of a rise in electro conductivity and a decrease in pH. However, hydrazine contains no carbon, and therefore such a problem does not arise.

$$N_2H_4 + O_2 \rightarrow N_2 + 2H_2O \quad \text{(Equation 4)}$$

$$N_2H_4 + 2H_2O_2 \rightarrow N_2 + 4H_2O \quad \text{(Equation 5)}$$

(2) Hydrazine is higher than hydrogen in the reaction rate with oxygen and hydrogen peroxide. Accordingly, hydrazine rapidly reacts to form nitrogen and water, and the rise in electric conductivity, caused by its residence, is suppressed.

(3) Hydrazine is a liquid substance and chemically stable, so that it is easy to handle. It can be injected by means of a pump even into a site of high pressure.

However, when subjected to γ ray irradiation, hydrazine undergoes the reaction of (Equation 6), and releases ammonia and hydrogen in addition to nitrogen.

$$N_2H_4 \rightarrow NH_3 + (1/2)N_2 + (1/2)H_2 \quad \text{(Equation 6)}$$

However, even in this case, due to the γ ray exposure, the reaction between N2H4 and radical forms a N2H3 radial which reacts with oxygen quite rapidly. The inventors have found that, so far as the amount of hydrazine is not excessive to oxygen or hydrogen peroxide, the quantities of ammonia and hydrogen formed by the reaction of (Equation 6) are only slight, and the influence on the water quality and main steam line dose rate can be minimized.

Figure 6:
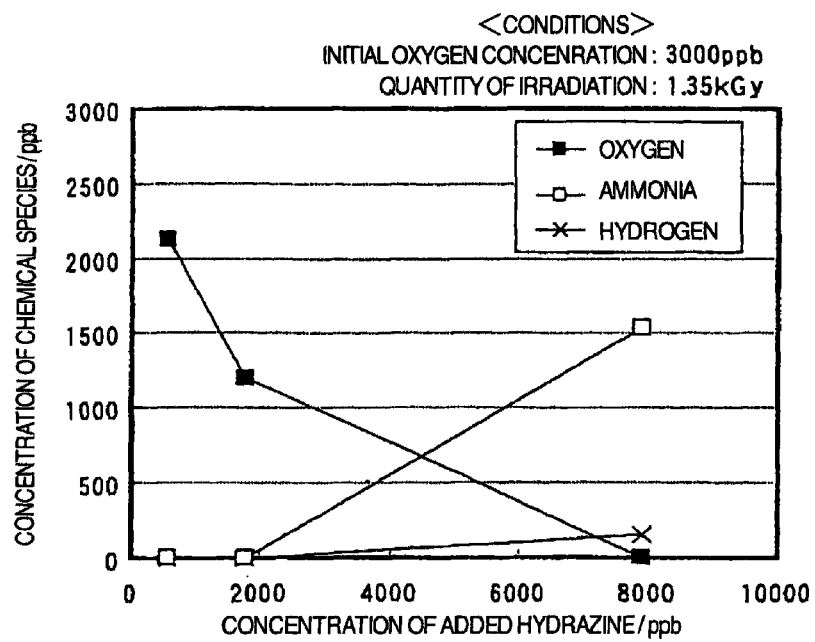
FIG. 6 is a graph illustrating the relations between concentration of added hydrazine and concentrations of oxygen, ammonia and hydrogen.

In order to confirm the above-mentioned reaction, the inventors added hydrazine to oxygen-containing water having a high temperature of 280° C. and irradiated the system with Co-60, and followed the variations of oxygen concentration and by-product concentration based on hydrazine concentration. The results are shown in FIG. 6. When oxygen was excessive to the hydrazine concentration based on the stoichiometric quantities of the reaction of (Equation 4), the oxygen concentration decreased without formation of ammonia or hydrogen. On the other hand, when the concentration of hydrazine was excessive as compared with oxygen concentration, oxygen was consumed and at the same time ammonia and hydrogen were formed. From the results mentioned above, it was confirmed that, when oxygen is present in the system, hydrazine does not undergo the reaction of (Formula 6) even in exposure to γ ray, but the hydrazine reacts with oxygen to form nitrogen and water.

Further, it became apparent that an excessive amount of hydrazine is decomposed into ammonia and hydrogen when exposed to γ ray. Based on this fact, the inventors found that the ammonia concentration in the cooling water in the reactor pressure vessel bottom can be used as an indication for controlling the amount of injected hydrazine. This is for the reason that existence of ammonia indicates that hydrazine is present at least in an amount enough for consuming the oxygen and hydrogen peroxide. Since ammonia forms ammonium ion and hydroxide ion in the neighborhood of room temperature, its existence can be indirectly confirmed by measuring conductivity or pH. On the other hand, when hydrazine is insufficient, ammonia is not formed. Accordingly, the ammonia concentration in the bottom of reactor is useful as an indication for judging the de-oxidant effect of hydrazine in the cooling water of reactor.

The effect of injection of hydrazine can be surely evaluated by measuring ECP by the measurement of oxygen concentration in the cooling water at the bottom of reactor pressure vessel or by using an ECP sensor provided on the drain line led from the bottom of reactor pressure vessel, and thereby combining the effect of hydrazine injection with a monitor.

The inventors have found that the concentration of oxygen and hydrogen peroxide in the reactor water can be decreased more economically and with smaller subsidiary effects by combining the injection of reductive nitrogen compound and the injection of hydrogen and appropriately controlling their concentrations. Although the concentration of oxygen and hydrogen peroxide in the reactor water can be reduced by merely injecting the reductive nitrogen compound, it can generally be said that the price per mole of reductive nitrogen compound is higher than that of hydrogen. Further, in this technique, a reductive nitrogen compound is injected at a high concentration, and therefore the excessive reductive nitrogen compound emits ammonia to make an adverse influence, unless the amount of reductive nitrogen compound is strictly controlled so as to become an optimum amount for consuming oxygen and hydrogen peroxide. Accordingly, it is most desirable to convert the residual parts of oxygen and hydrogen peroxide which has not been consumed by hydrogen injection into water with the reductive nitrogen compound, because this technique can minimize the necessary amount of reductive nitrogen compound and gives a room to the control.

Figure 7:
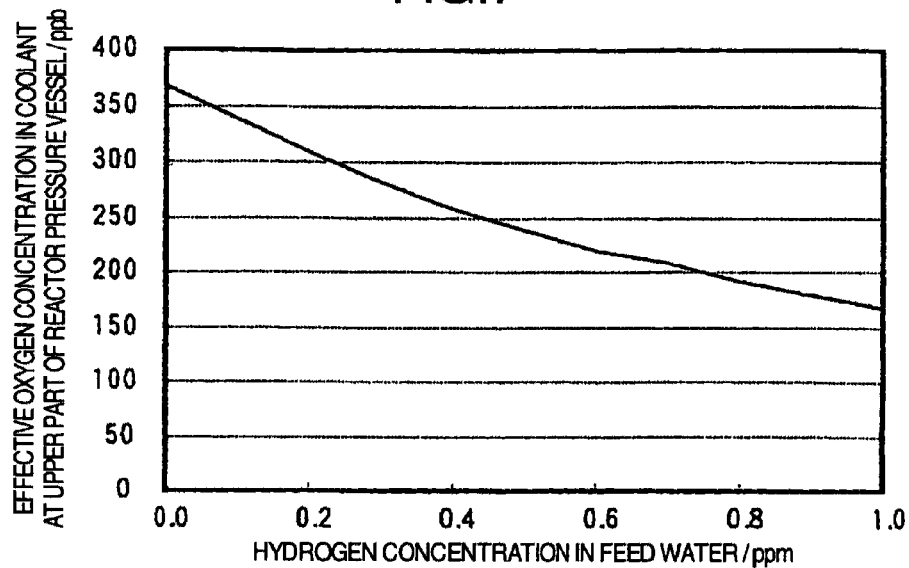
FIG. 7 is a graph illustrating the relation between concentration of hydrogen in the feed water and effective oxygen concentration.

FIG. 7 illustrates the results of analysis of effective oxygen concentration in the upper part of reactor which has been subjected to hydrogen injection. It is apparent that, if hydrogen injection is carried out, the concentrations of oxygen and hydrogen peroxide in the upper part of reactor are decreased. This is for the reason that the hydrogen present in the cooling water at the bottom of reactor pressure vessel suppresses the formation of oxygen and hydrogen peroxide caused by the radiolysis of water in the core. This effect is not readily obtainable even if a reductive nitrogen compound is added. If the concentrations of oxygen and hydrogen peroxide in the upper part of reactor is lowered, the amount of reductive nitrogen compound necessary for consuming the oxygen and hydrogen peroxide in the reactor cooling water can be decreased. As has been mentioned above, an increase in the main steam line dose rate takes place when the hydrogen concentration in the feed water has exceeded about 0.4 ppm. Accordingly, when hydrogen concentration in feed water is 0.4 ppm or below, no rise in the main steam line dose rate takes place, and even if a reductive nitrogen compound is added, the hydrogen concentration in the reactor cooling water does not increase greatly, so that combination of hydrogen injection and addition of reductive nitrogen compound does not lead to an increase in the main steam line dose rate. Further, when injection of hydrogen and addition of reductive nitrogen compound are combined, there arises a merit that the nitrogen molecule formed from reductive nitrogen compound is not readily oxidized into compounds having a higher oxidation number such as nitrous acid, nitric acid, etc. When the amount of reductive nitrogen compound is smaller than that of oxygen or hydrogen peroxide, the unreacted oxygen and hydrogen peroxide and the formed nitrogen coexist in the down-stream of the site where the reductive nitrogen compound has reacted completely. In such a site, there is a possibility that the nitrogen is oxidized to form nitrous acid and nitric acid, in some cases. Nitrous acid and nitric acid are not desirable, because they make a cause of a rise in electric conductivity and a decrease in pH. Although these oxidative anions do not cause a marked acceleration of SCC, so far as they are present in the cooling water for reactor only in a small amount, there is a fear that they can cause a decrease in pH and thereby a decrease in the stability of the oxides present on the line surface or fuels, and they can exercise an influence on the radioactivity concentration of core water. It is preferable, accordingly, to use hydrogen injection in combination and thereby maintain the cooling water for reactor in a reductive atmosphere, even after the reductive nitrogen compound has become unable to react. The amount of hydrogen injection can be optimized by monitoring the main steam line dose rate or by measuring the hydrogen concentration in the cooling water at the bottom of reactor pressure vessel.

Further, the inventors have found that alcohols (CnH2n+1OH; wherein n is a natural number) are compounds capable of decreasing the concentrations of oxygen and hydrogen peroxide in the reactor cooling water without greatly affecting the hydrogen concentration. An alcohol reacts with oxygen or hydrogen peroxide according to (Equation 7) or (Equation 8) to yield carbon dioxide and water.

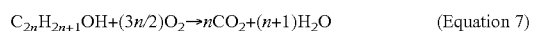
$$C_{2n}H_{2n+1}OH + (3n/2)O_2 \rightarrow nCO_2 + (n+1)H_2O \quad \text{(Equation 7)}$$

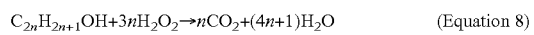
$$C_{2n}H_{2n+1}OH + 3nH_2O_2 \rightarrow nCO_2 + (4n+1)H_2O \quad \text{(Equation 8)}$$

Figure 8:
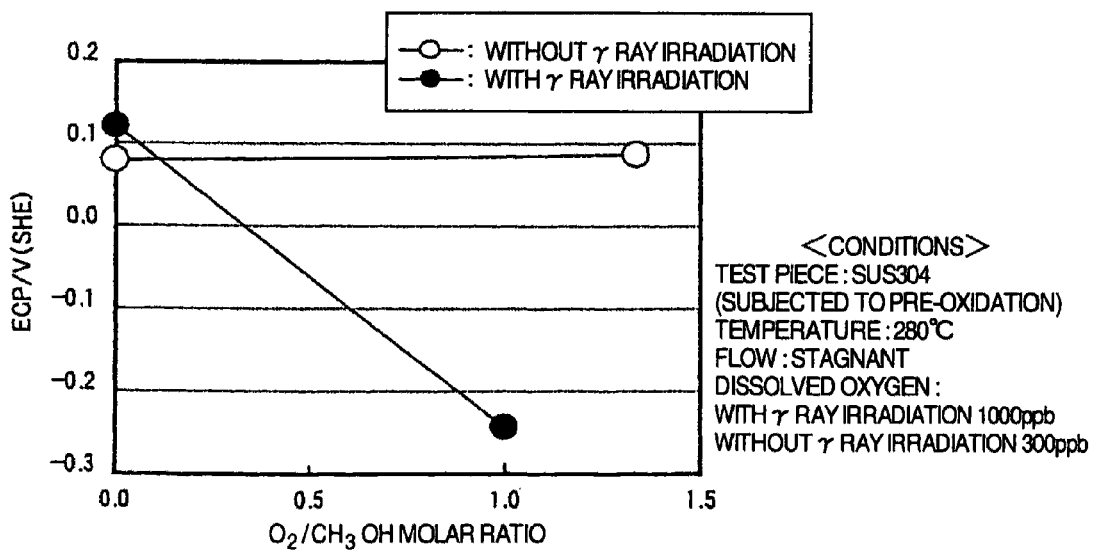
FIG. 8 is a graph showing the electrochemical corrosion potential of 304SS in a case of adding methanol and carrying out γ ray irradiation and a case of adding methanol and carrying out no γ ray irradiation.

However, unlike the case of hydrazine, the reactions of Equations 7 and 8 do not take place in the absence of γ ray irradiation. In order to confirm this fact, an alcohol (methyl alcohol) was injected into water of high temperature (280° C.) and ECP of 304SS was measured in the case of carrying out γ ray irradiation and in the case of not carrying out γ ray irradiation. The results are shown in FIG. 8. It is apparent from FIG. 3 that ECP of 304SS is about 0.1V (SHE) when the dissolved oxygen concentration is 300 ppb, and ECP decreases as the dissolved oxygen concentration decreases, and ECP reaches about −0.5V (SHE) when dissolved oxygen is 10 ppb or less. It is considered that, when γ ray irradiation is not carried out, oxygen remains without reacting with methanol and therefore ECP has become about 0.1V (SHE), while when γ ray irradiation is carried out, oxygen reacts with methanol to decrease the oxygen concentration so that ECP has become about −0.25V (SHE). Based on this result, it has been confirmed that methanol reacts with oxygen only when γ ray irradiation is carried out.

On the other hand, when an alcohol reacts with oxygen and hydrogen peroxide, CO2 is formed, which reacts with water according to (Equation 9) to form carbonate ion.

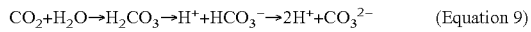

$$CO_2+H_2O \rightarrow H_2CO_3 \rightarrow H^+ + HCO_3^- \rightarrow 2H^+ + CO_3^{2-}$$ (Equation 9)

Thus, alcohols are disadvantageous in that they make higher the conductivity of reactor water and lower the pH value thereof. Accordingly, it is considered appropriate to use alcohols in combination with a reductive nitrogen compound such as hydrazine. Reductive nitrogen compounds such as hydrazine are reactive with oxygen and hydrogen peroxide even in the absence of γ ray irradiation, while alcohols such as methanol do not react with oxygen and hydrogen peroxide in the absence of γ ray irradiation. Therefore, it is considered that reductive nitrogen compounds such as hydrazine are higher in reactivity than alcohols such as methanol, and preferentially react with oxygen and hydrogen peroxide. Thus, by injecting a reductive nitrogen compound such as hydrazine in an amount somewhat smaller than the stoichiometric amount of the reaction with oxygen and hydrogen peroxide, and injecting the alcohol such as methyl alcohol in an amount needed for reacting the residual oxygen and hydrogen peroxide, the formation of ammonia which is a problem arising when a reductive nitrogen compound such as hydrazine is injected in itself alone can be suppressed. Further, there is a merit that pH can be returned to the neutral side by carbonate ion, even if the ammonia forms ammonium ion and shifts pH to the alkaline side.

Additionally saying, it can be expected that, by adding an ion, an oxide or a hydroxide of manganese, zinc, molybdenum, tungsten or the like to the reactor water, an oxidation reduction reaction between these substances and reductive nitrogen compound takes place to accelerate the reactions of (Formula 4) and (Formula 5), and thereby the concentrations of oxygen and hydrogen peroxide are decreased, and thereby ECP is reduced.

Next, BWR to which this invention is applied will be explained with reference to FIG. 1. In BWR, a condenser 13, a condensate filter demineralizer 3, a feed water pump 4, a feed water heater 5 and a reactor pressure vessel 1 charged with a nuclear fuel are connected by means of feed water line 6, and the reactor pressure vessel 1 and turbine 2 are connected by means of main steam line 14 to form a closed loop. Using water as the reactor coolant, water is converted to steam in the reactor pressure vessel 1. A turbine is rotated by the use of this steam, and thereby a generator (not shown in the figure) is rotated to generate electricity. The steam is returned to water in the condenser 13, made free from impurities in the condensate filter demineralizer 3, and returned to reactor pressure vessel 1 through feed water heater 5 by means of feed water pump 4. Apart from it, the lower part of reactor pressure vessel 1 and inlets of re-circulation pump 7 and jet pump 15 are connected by means of Primary Loop re-circulation system line 16. Heat output is increased by increasing the flow rate of cooling water flowing into the core by means of Primary Loop re-circulation pump 7. ABWR has no Primary Loop re-circulation system line 16, and the Primary Loop re-circulation pump 7, but has a structure of internal pump where the Primary Loop re-circulation pump 7 is provided in the pressure vessel 1. Hereinafter, an explanation will be made by referring to a reactor having a Primary Loop re-circulation system line 16. In this reactor, the upstream side of the Primary Loop re-circulation system line 16 and the reactor water clean up system 9, reactor water clean up system heat exchanger 11, reactor water filter demineralizer 12 and feed water system line 6 are connected by means of reactor water clean up system line 10, and the reactor water is passed to the reactor water filter demineralizer 12 by means of reactor water clean up system pump 9 to remove impurities from the reactor water. Further, a bottom drain line 8 is provided to connect the bottom of reactor pressure vessel 1 to the reactor water clean up system line 10. Further, in the upper part of the core of the reactor pressure vessel 1, there is provided an emergency core cooling system for injecting water into the rector core in order to cool the core at the time of emergency and a control rod drive hydraulic system for injecting cooling water to drive the control rod for controlling the nuclear reaction of the fuel in the reactor are provided (not shown in the figure). Further, water qualities in the system lines are monitored by means of water quality monitors 21 to 25, and the dose rate of the main steam line 14 is monitored by means of the main steam line dose rate measuring equipment 26. In the case of ABWR, there is provided a reactor water clean up system line 10 for drawing out a part of the reactor water from the upper part of reactor pressure vessel 1, cooling it by passing it through reactor water clean up system heat exchanger 11, removing the impurities from the reactor water in the reactor water clean up equipment and returning it to the feed water line 6.

In the above-mentioned BWR, the time at which a reductive nitrogen compound is injected in order to mitigate SCC is roughly classified into the following two times, and the site of injection varies depending on the time of injection.
(1) At the times of start up and shut down—The time period of start up operation of the reactor, namely from the drawing out of the control rod to the injection of cooling water from water feed system; and the time period of shut down, namely from the time of stopping the injection of feed water from the water feed system to the time of wholly inserting the control rod.
(2) At the time of operation—The time period of starting up the reactor, the time period of normal operation, and the time period of shut down; provided that the period of (1) is excepted.

The time periods of start up and shut down are period in which hydrogen and reductive nitrogen compound cannot be sent into the pressure vessel of the reactor, even if hydrogen and reductive nitrogen compound are injected into the cooling water from the feed water system. Therefore, it is necessary to inject hydrogen and reductive nitrogen compound into the cooling water flowing in at least one systems selected from the Primary Loop re-circulation system, reactor water clean up system, emergency core cooling system and control rod drive hydraulic system which can feed cooling water to reactor pressure vessel, for injecting hydrogen and reductive nitrogen compound into the reactor pressure vessel. At the time of start up and shut down, the radiation emitted from the core has a weak intensity, so that in the case of hydrogen injection, the efficiency of removal of oxygen and hydrogen peroxide is considered to be low. Thus, injection of reductive nitrogen compound reactive with oxygen and hydrogen peroxide even in the absence of the action of irradiation is particularly effective. Since steam flows into the condensation tank only when the steam flow rate is low and the turbine by-path valve is open, the influence of flying out of ammonia can also be neglected. Further, since the allowable range of ammonia concentration in the core water is broader than at the time of normal operation, the effect of injection of reductive nitrogen compound is very great in this period.

On the other hand, at the time of normal operation, a reductive nitrogen compound is injected from at least one system selected from the water feed system, Primary Loop re-circulation system, reactor water clean up system, emergency core cooling system and control rod drive hydraulic system. Since the point of hydrogen injection is usually selected from the sucking-in side of the condensate pump having a low pressure, there is no problem in the positioning of hydrogen injection point and reductive nitrogen compound injection point, so that hydrogen injection and reductive nitrogen compound injection can be carried out simultaneously.

The main place at which oxygen and hydrogen peroxide are formed by radiolysis of water is the core of the reactor. The emergency core cooling system and the control rod drive hydraulic system, capable of directly feed cooling water to the core, can directly inject hydrogen and reductive nitrogen compound into the generation source of oxygen and hydrogen peroxide, and therefore they have a merit of capable of decreasing oxygen and hydrogen peroxide in the early stage. Further, water is usually stagnated on the inner surface of emergency core cooling system and the surface is exposed to intense irradiation, as a result of which such areas are apt to generate SCC. Thus, if reductive nitrogen compound is passed constantly, SCC of the lines can be prevented and integrity of the system used at the time of emergency can be secured.

In the case that a reductive nitrogen compound is injected from the feed water system line 6, it is preferable to feed the water to a downstream point of the feed water heater 5. Carbon steel is used as a material of the feed water system line 6, and oxygen is injected into the cooling water flowing therein in order to suppress corrosion of the pipe line. There is a possibility that the reaction with oxygen is catalyzed by the material surface, so that the reaction between oxygen and reductive nitrogen compound can be unnegligible at the position having a large surface area per unit volume of fluid as in the feed water heater 5, which can lead to a drop in utilization rate of the reductive nitrogen compound. Further preferably, it is desirable to inject the reductive nitrogen compound from downstream of water quality monitor 21 for the cooling water of feed water system line 6. In the water quality monitor 21, the impurities present in the cooling water taken into the reactor pressure vessel is monitored by checking electric conductivity. This is for the reason that, if the reductive nitrogen compound is injected into upstream thereof, the electric conductivity rises when the reductive nitrogen compound is dissociated into ions, and the presence of impurity becomes impossible to monitor.

In the case where a reductive nitrogen compound is injected from the reactor water clean up system line 10, it is preferable to inject it from a down-stream point of the reactor cooling water filter demineralizer 12. This is for the reason that, when the reductive nitrogen compound is ionized, the ions are caught at the reactor water filter demineralizer 12, and the utilization rate of reductive nitrogen compound in the reactor pressure vessel 1 becomes lower. Further preferably, the reductive nitrogen compound is injected from the downstream point of water quality monitor 24 which is located at downstream of the reactor water filter demineralizer 12. In the water quality monitor 24, the impurities in the cooling water passing through the reactor water filter demineralizer 12 are monitored by electric conductivity. If it is injected from the upstream thereof, the ionization of reductive nitrogen compound brings about a rise in electric conductivity, which makes it impossible to monitor the presence of impurities.

EXAMPLES

Hereunder, examples relating to injection of reductive nitrogen compound into cooling water, according to this invention, will be mentioned.

Example 1

Figure 2:
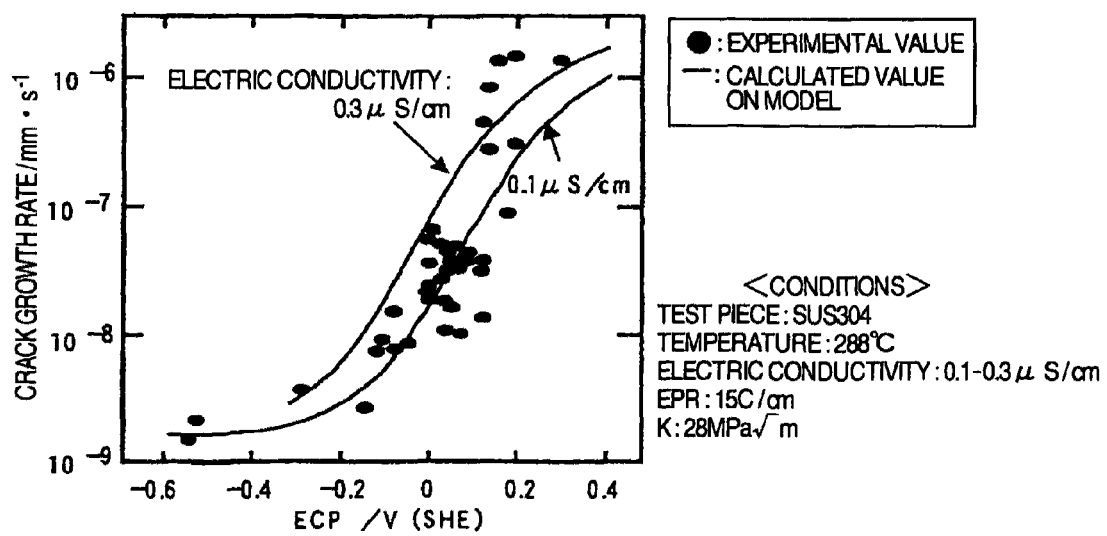
FIG. 2 is a graph illustrating the relation between electrochemical corrosion potential and crack growth rate in 304SS.

As the first example of this invention, an example in which only a reductive nitrogen compound is injected at the times of start up and shut down will be mentioned. At the times of start up and shut down, temperature is low and $\gamma$-ray exposure is small, so that the water-forming reaction between reductive nitrogen compound and oxygen and hydrogen peroxide does not take place readily. FIG. 5 illustrates hydrazine concentration dependence of ECP of 304SS, wherein hydrazine was added as a reductive nitrogen compound. If the ECP dependence of CGR shown in FIG. 2 is taken into consideration, it is necessary to add hydrazine in an amount of 50 ppb or more or further preferably in an amount of 100 ppb or more in order to reduce CGR to $\frac{1}{10}$ of that in the case of no hydrazine injection. On the other hand, addition of 300 ppb or more brings about no change in the ECP-lowering effect. From the electric conductivity dependence of CGR shown in FIG. 2, it is apparent that, even when ECP is the same, a higher electric conductivity gives a greater CGR. Accordingly, it is not desirable to add hydrazine in an excessive amount in order to increase electric conductivity of cooling water. Based on the above-mentioned facts, it can be said that it is preferable to control the hydrazine concentration so as to come to 300 ppb or less or to control reductive nitrogen compound concentration so as to come to $9.4 \times 10^{-6}$ mol/liter or less; and it is further preferable to control hydrazine concentration to 50 ppb to 300 ppb, namely to control the reductive nitrogen compound concentration so as to come to from $1.5 \times 10^{-6}$ to $9.4 \times 10^{-6}$ mol/liter.

Figure 1:
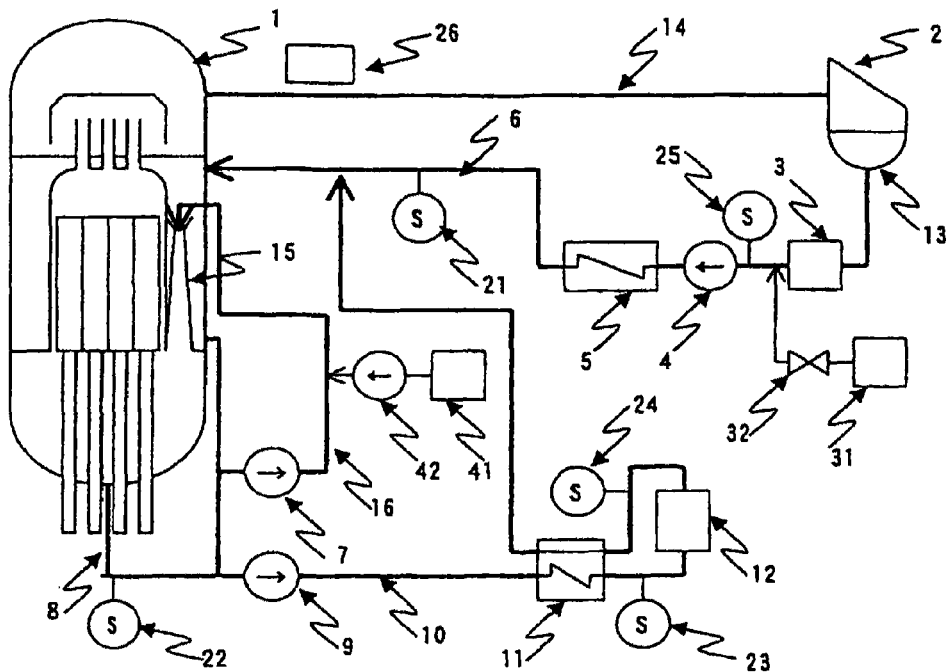
FIG. 1 is a drawing illustrating a BWR to which this invention is applied.

FIG. 1 illustrates one example of the system chart in a case that a reductive nitrogen compound solution stored in the reductive nitrogen compound solution tank 41 is injected into Primary Loop re-circulation system line 16 by means of reductive nitrogen compound solution injecting pump 42. In order to adjust the concentration of reductive nitrogen compound to a prescribed concentration, the reductive nitrogen compound of which amount is calculated by the following Equation 10 is injected:

(Amount of injected reductive nitrogen compound)= (Prescribed concentration of reductive nitrogen compound)×(Amount of cooling water in the pressure vessel of reactor)÷(concentration of reductive nitrogen compound in the reductive nitrogen compound solution tank)    (Equation 10)

After once completing the injection, injection of the consumed amount of reductive nitrogen compound is enough for adjusting the reductive nitrogen compound concentration to the prescribed value. Concentration of the reductive nitrogen compound is determined by analyzing the concentration of reductive nitrogen compound in the sample taken out from the cooling water of the bottom part of reactor pressure vessel 1 through the water quality monitors 22 and 23. The amount to be re-injected is calculated from the following (Equation 11).

(Amount of reductive nitrogen compound to be injected)={(Prescribed concentration of reductive nitrogen compound)−(Analyzed value of reductive nitrogen compound concentration)}× (Amount of cooling water in the reactor pressure vessel)÷(Concentration of reductive nitrogen compound in the reductive nitrogen compound solution tank) (Equation 11)

By intermittently carrying out the above-mentioned procedures of analysis and re-injection, concentration of reductive nitrogen compound can be controlled so as to come to the prescribed value. It is also possible to carrying out a continuous monitoring by measuring the electric conductivity of the cooling water in place of intermittently analyzing the concentration of reductive nitrogen compound. This is for the reason that electric conductivity can be converted to concentration of reductive nitrogen compound by previously determining the coefficients a and b in (Equation 12) experimentally.

(Concentration of reductive nitrogen compound)={(Electric conductivity)−b}÷a (Equation 12)

Figure 9:
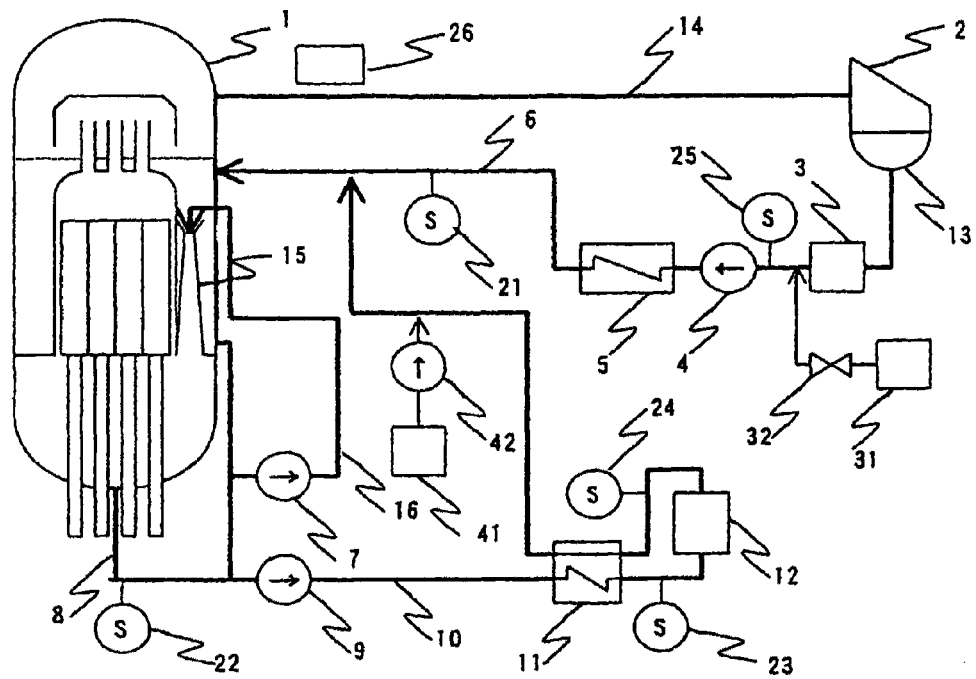
FIG. 9 is a drawing illustrating BWR to which this invention is applied.

In FIG. 1 is shown an example in which a reductive nitrogen compound injecting equipment is connected to the Primary Loop re-circulation system line 16. However, it is also possible to similarly control the injection of reductive nitrogen compound by connecting the reductive nitrogen compound injecting equipment to the reactor water clean up system line 10, as shown in FIG. 9. The other system lines are also similar.

Figure 10:
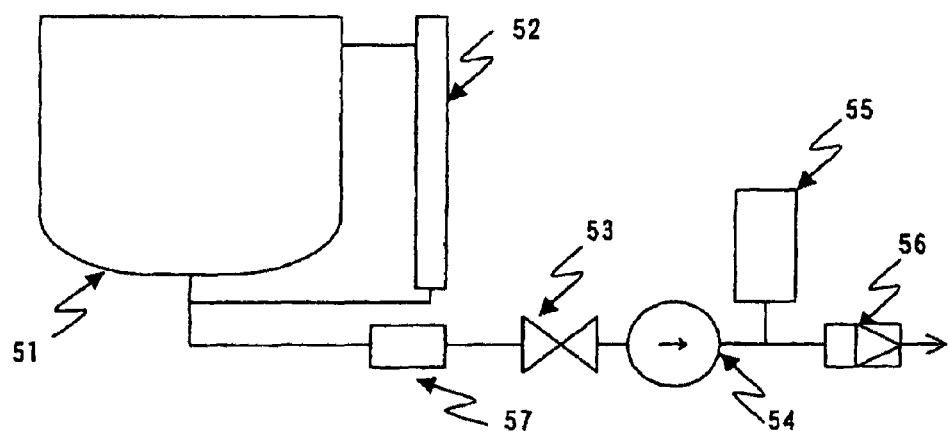
FIG. 10 is a drawing illustrating the reductive nitrogen compound injecting apparatus.

FIG. 10 illustrates one example of the reductive nitrogen compound injecting equipment preferably usable for the injection while controlling the amount of reductive nitrogen compound. This equipment is provided with a reductive nitrogen compound tank 51, in addition to which at least one of water level indicator 52, flowmeter 55 and integrated flowmeter 57 is provided. In addition to them, a reductive nitrogen compound solution injection pomp 54 for injecting a solution of reductive nitrogen compound into the cooling water, and a valve 53 and a check valve 56 for preventing erroneous injection of reductive nitrogen compound or back-flow of cooling water are equipped, and they are connected together by means of pipe lines. The tanks and lines are made of a steel material, the surfaces to be contacted with the reductive nitrogen compound are preferably coated with a resin material such as poly-tetrafluoroethylene resin to prevent a direct contact between steel material and reductive nitrogen compound. This is for the reason that a direct contact between steel material and reductive nitrogen compound can cause a decomposition of the reductive nitrogen compound. Further, there is a possibility that, if a reductive nitrogen compound comes into a direct contact with air, the reductive nitrogen compound can be decomposed. For preventing this decomposition, it is advisable to bubble the reductive nitrogen compound present in the tank with argon gas or to cover the liquid surface with argon or the like.

Example 2

Next, as the second example of this invention, an example in which only a reductive nitrogen compound is injected at the time of operation will be mentioned. Since temperature is high and γ-ray exposure is greatest at the time of operation, the water-forming reaction between reductive nitrogen compound and oxygen and hydrogen peroxide is accelerated. Accordingly it is necessary to inject the reductive nitrogen compound continuously.

Figure 11:
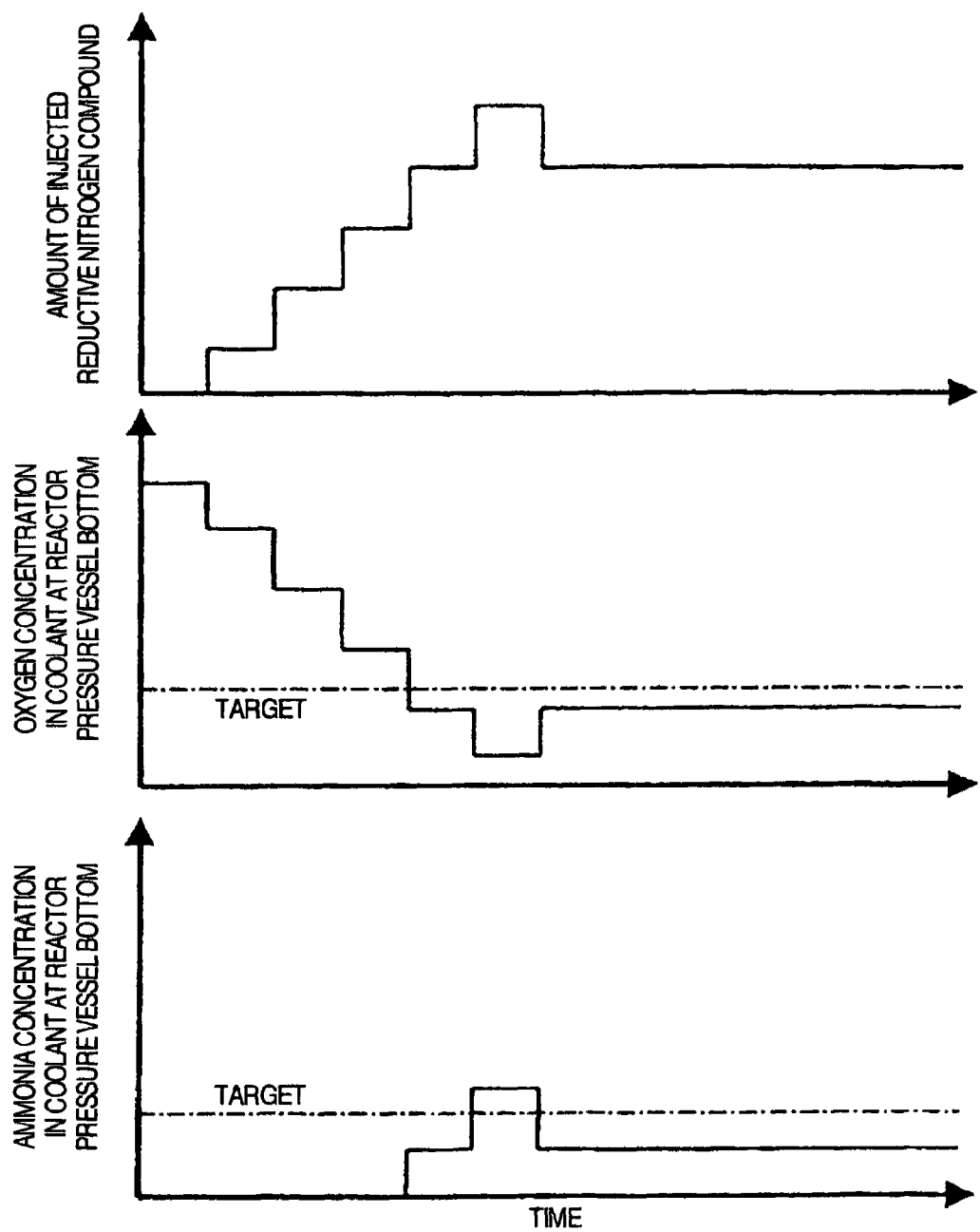
FIG. 11 is a drawing illustrating the method for controlling the amount of injection of the reductive nitrogen compound in Example 2 of this invention.

In FIG. 6 are shown the changes of oxygen and by-products in a case of adding hydrazine as a reductive nitrogen compound to high-temperature water containing dissolved oxygen and carrying out a γ ray irradiation. In case that the concentration of reductive nitrogen compound does not reach the amount needed for converting oxygen to water, a residual part of oxygen remains. In case that the concentration of reductive nitrogen compound is higher than the amount necessary for converting oxygen to water, oxygen is consumed and ammonia is formed. Based on these facts, the proper amount of injected reductive nitrogen compound can be controlled by using the concentrations of oxygen and ammonia contained in the reactor pressure vessel bottom water as indications. One example of the controlling method will be explained blow with reference to FIG. 11.

Figure 12:
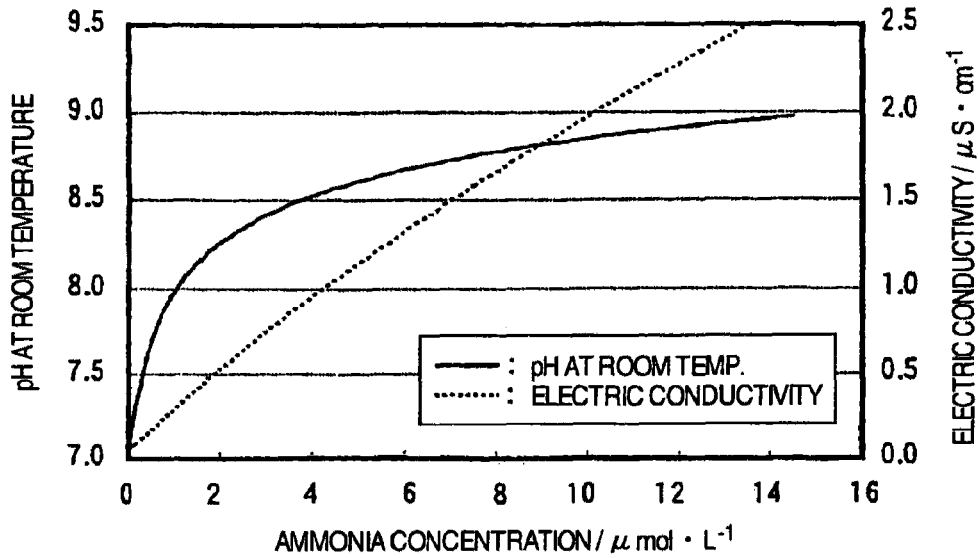
FIG. 12 is a graph illustrating the relation between ammonia concentration and pH and electric conductivity.

If the amount of injection is increased stepwise, the oxygen concentration in the cooling water reactor pressure vessel bottom decreases at first so as to match the step. The target value of oxygen concentration is 10 ppb, and further preferably 5 ppb. So far as the oxygen concentration is lower than the target, ECP can be lowered sufficiently and CGR can be made small. If the amount of injection of reductive nitrogen compound is stepwise increased, ammonia becomes detectable in the cooling water of reactor pressure vessel bottom. Since ammonia increases the load of reactor water filter demineralizer and leads to a rise in electric conductivity, a lower ammonia concentration is desirable. FIG. 12 shows the relations between ammonia concentration and pH at room temperature and electric conductivity. From the viewpoint of water quality management criteria of BWR, it is required that pH at room temperature is 5.6 to 8.6, and electric conductivity does not exceed 1 μS/cm. Accordingly, it is preferable that ammonia concentration in the reactor water does not exceed $4.2 \times 10^{-6}$ mol/liter.

The oxygen concentration can be analyzed by means of a dissolved oxygen meter; while the ammonia concentration can be analyzed by means of ion meter, calorimetric analysis or ion chromatography. It is also allowable to use electric conductivity or pH as an indication in place of analyzing ammonia concentration, because electric conductivity and pH can be converted to ammonia concentration based on FIG. 12.

As above, the amount of injection of reductive nitrogen compound is stepwise increased, and the amount of injection of reductive nitrogen compound at which the ammonia concentration or the electric conductivity and pH comes to lower than the target value is previously determined. After that time of the operation, the designed amount of reductive nitrogen compound is injected.

Otherwise, the range of amount of injection is determined, and reductive nitrogen compound is injected in that concentration range. It is also allowable to alter the amount of injection manually in the light of measured values of pH and ammonia, or to provide a control system into which measured values are fed back and thereby control the amount of injection.

Figure 3:
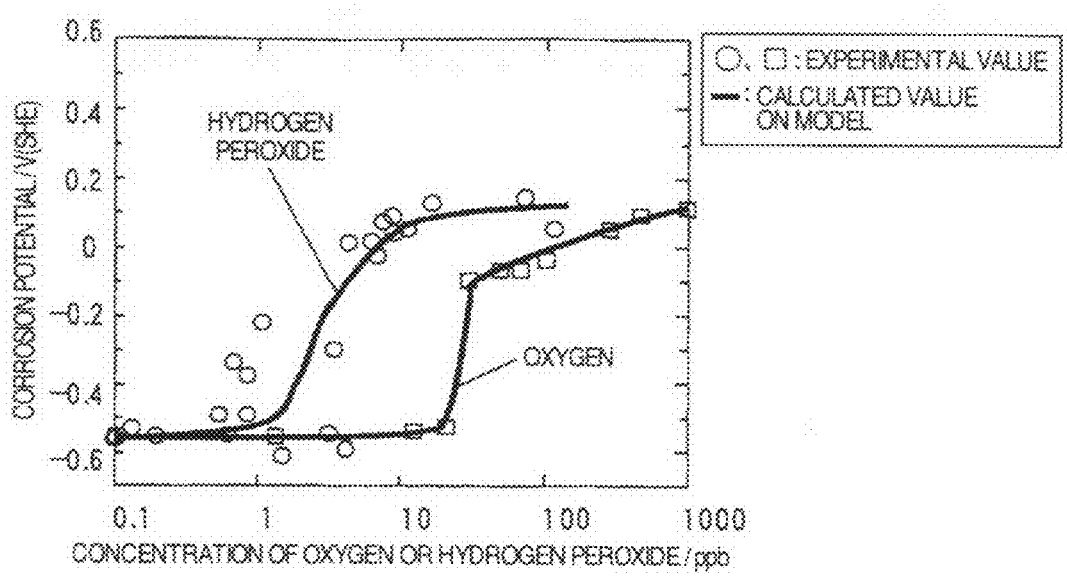
FIG. 3 is a graph illustrating the relation between concentrations of oxygen or hydrogen peroxide and electrochemical corrosion potential.

In this example, the mount of reductive nitrogen compound which must be injected has been determined by taking oxygen concentration as an indication. It is also possible to use ECP of the plant-constructing material immersed in the cooling water as an indication. This is for the reason that, as shown in FIG. 3, oxygen concentration has a 1:1 correlation with ECP, oxygen concentration can be determined from ECP.

Example 3

Next, as the third example of this invention, an example in which hydrogen and a reductive nitrogen compound are injected into the cooling water will be mentioned. In case that hydrogen is injected, the hydrogen concentration in the cooling water at the bottom of reactor pressure vessel increases. If the hydrogen concentration exceeds a definite value, dose rate of the main steam line can increase. Accordingly, it is necessary to control the amount of injected hydrogen together with the reductive nitrogen compound to obtain an optimum condition. Since hydrogen is usually cheaper in price than reductive nitrogen compound, it is preferable to increase the amount of hydrogen and decrease the amount of reductive nitrogen compound.

Figure 13:
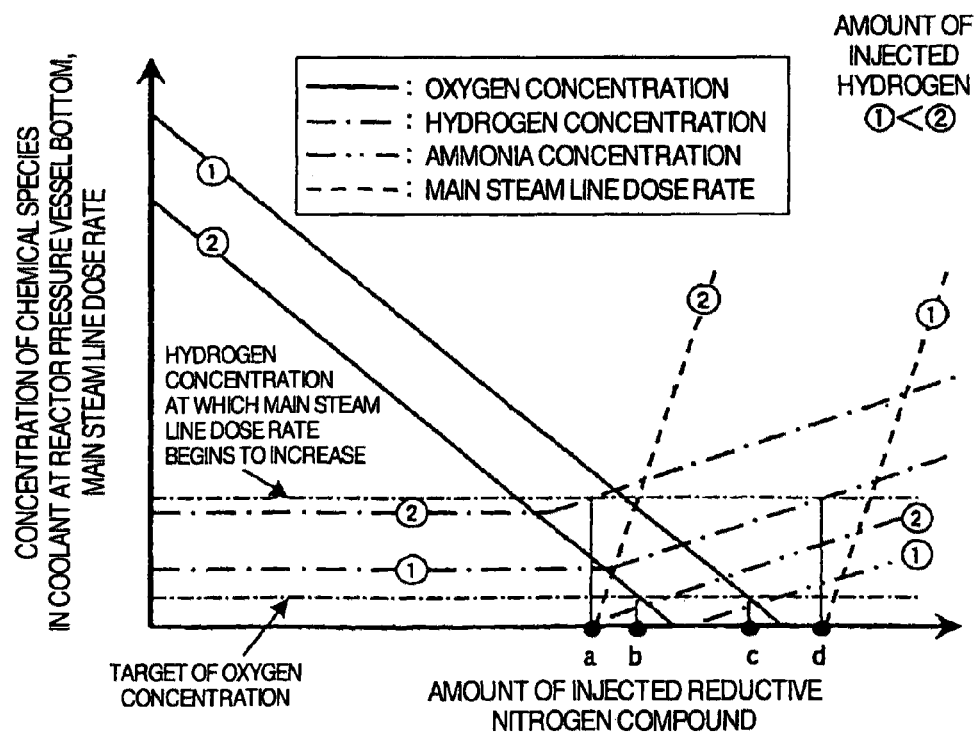
FIG. 13 is a graph illustrating the relations between oxygen concentration, hydrogen concentration, ammonia concentration and main steam line dose rate and the amount of injection of reductive nitrogen compound.

FIG. 13 diagrammatically illustrates the changes of concentrations of oxygen, hydrogen and ammonia in the cooling water at the bottom of reactor pressure vessel, and the dose rate of main steam line, in the case of changing the amount of injection of reductive nitrogen compound while keeping the injection of hydrogen constant. In FIG. 13 is simultaneously shown a case of changing the amount of hydrogen injection. The dose rate of main steam line is taken to increase when the hydrogen concentration in the cooling water at the bottom of reactor has exceeded a definite value. In FIG. 13, a and d denote the amount of injection of reductive nitrogen compound at which dose rate of main steam line increases; while b and c are amount of injection of reductive nitrogen compound where oxygen concentration reaches the lowered target (b) by injection of reductive nitrogen compound. In the case of (2) where the injection of hydrogen is large, a small amount of reductive nitrogen compound is enough for reaching the lowered target of oxygen concentration (b), but the dose rate of main steam line begins to increase before reaching that amount of injection of reductive nitrogen compound (a). On the other hand, when the amount of injected hydrogen is small (1), the injected amount of reductive nitrogen compound is larger than that in the case of (2), but at such an amount the dose rate of main steam line does not rise (d). From the economical point of view, it is preferable to determine the maximum (1) as in the case of hydrogen injection (1). By stepwise changing the injected amounts of hydrogen and reductive nitrogen compound and determining the relation of FIG. 13, proper ranges of the injected amounts of hydrogen and reductive nitrogen compound can be determined.

On the other hand, it is expected from the relation shown in FIG. 13 that, if the amount of injection of hydrogen is decreased, the amount of injection of reductive nitrogen compound necessary for reducing the oxygen concentration will increase. By utilizing this fact, proper ranges of injection of hydrogen and reductive nitrogen compound can be determined more efficiently. This method will be explained below by referring to FIGS. 14 and 15.

Figure 14:
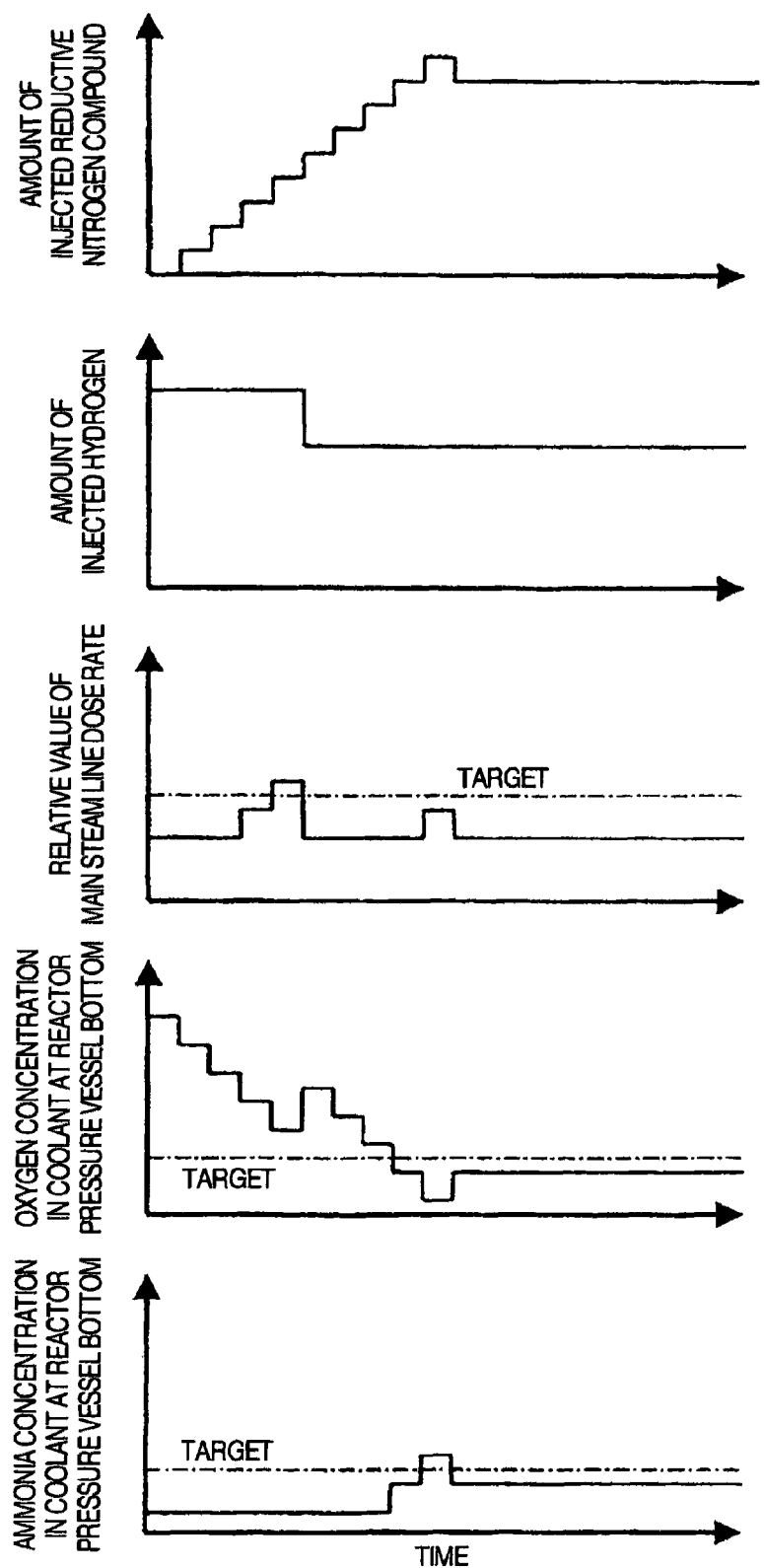
FIG. 14 is a drawing illustrating the method for controlling the amount of injection of reductive nitrogen compound and the amount of hydrogen in Example 3 of this invention.
Figure 15:
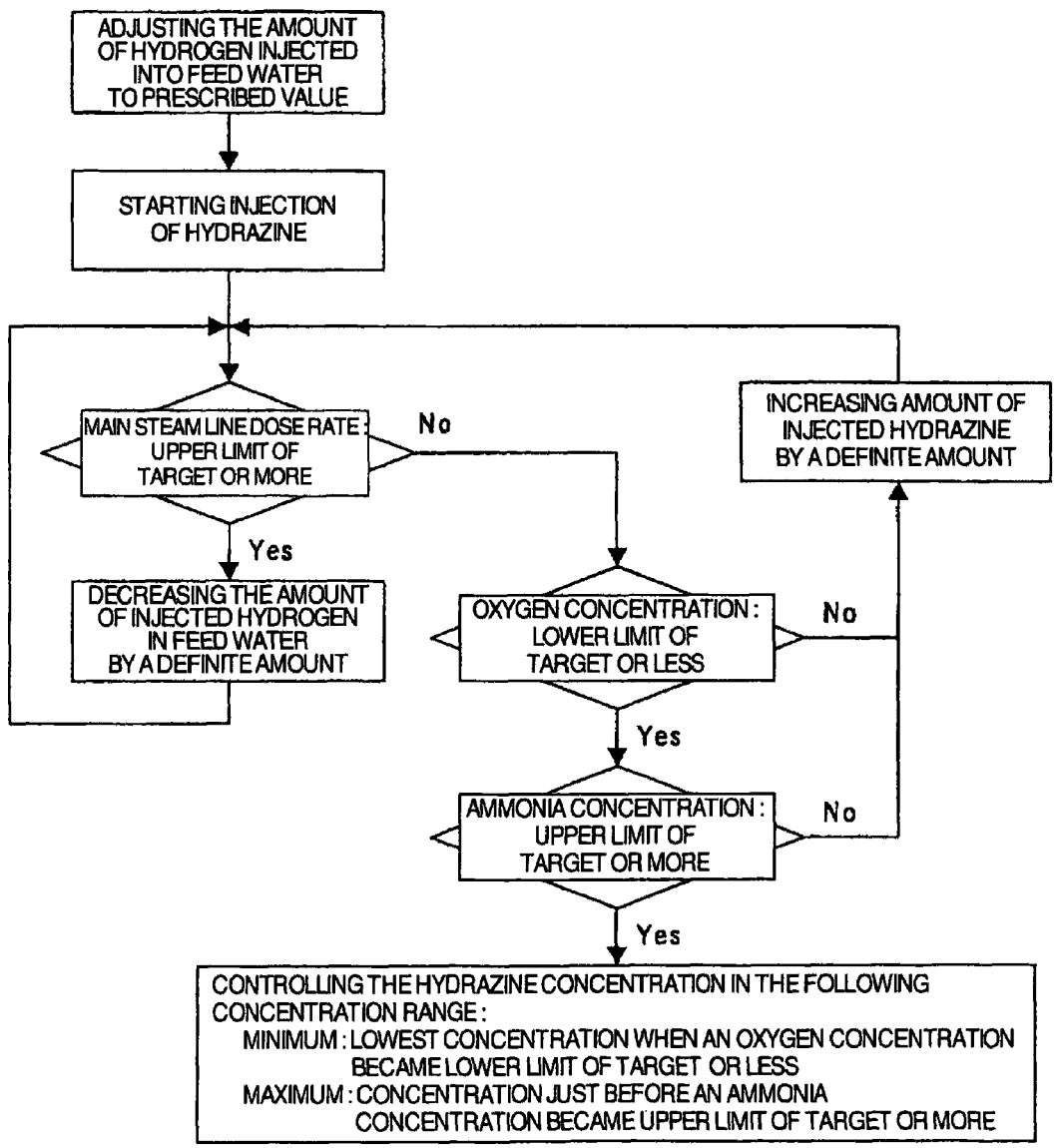
FIG. 15 is a flow chart illustrating the control of the amount of injection of reductive nitrogen compound and the amount of injection of hydrogen in Example 3 of this invention.

As shown in FIG. 14, a reductive nitrogen compound and hydrogen are stepwise injected, by taking the oxygen concentration and ammonia concentration in the coolant in the reactor pressure vessel bottom as indications. Concretely saying, according to the flow chart of FIG. 15, the amount of injected hydrogen and the amount of injected reductive nitrogen compound are varied. At first, injection of hydrogen is carried out at the critical amount of hydrogen injection giving a dose rate, in the main steam line, not exceeding the lower limit of target value. Subsequently, the concentration of reductive nitrogen compound is stepwise increased. When main steam line dose rate has exceeded in this process, the amount of injected hydrogen is decreased by a definite amount. The concentration of reductive nitrogen compound is increased while aiming at that the oxygen concentration will reach a value not exceeding the lower limit of target. By this procedure, the amount of injection of the reductive nitrogen compound giving an oxygen concentration not exceeding the target value can be determined. Further, in the same manner as in Example 2, the amount of injected reductive nitrogen compound is stepwise increased to determine the range of the amount of injected reductive nitrogen compound giving an ammonia concentration not exceeding the upper limit. By the procedure mentioned above, an amount of injection of reductive nitrogen compound giving an oxygen concentration not exceeding the lower limit of target is taken as a minimum value, and the amount of injection just before the ammonia concentration exceeds the aimed upper limit is taken as the upper limit.

In the subsequent period of operation, hydrogen and reductive nitrogen compound concentrations are so controlled as to come to the values determined above. It is also allowable to control the hydrogen injection by using the hydrogen concentration in the reactor pressure vessel bottom as an indication, in place of main steam line dose rate. In this case, injection of hydrogen only is previously carried out, and the relations of main steam line dose rate and hydrogen concentration in the bottom of reactor pressure vessel to the amount of hydrogen injection are determined, and further the relation between main steam line dose rate and hydrogen concentration in the bottom of reactor pressure vessel is determined. Hydrogen concentration can be continuously monitored by the use of dissolved hydrogen concentration meter. Further, it is also possible to use ECP of the plant-structural material dipped in cooling water as an indication, as has been mentioned in Example 2.

Example 4

Next, as the fourth example of this invention, a method of injecting hydrogen, a reductive nitrogen compound and an alcohol into cooling water will be mentioned. When hydrogen is injected, there is a possibility that the hydrogen concentration in the reactor pressure vessel bottom water increases, and if it exceed a definite value, main steam line dose rate increases, in the same manner as in Example 3. When an alcohol is injected, there is a possibility that, due to the carbonate ion, pH becomes low or electric conductivity becomes high. Accordingly, it is necessary to control the amounts of injection of alcohol and hydrogen together with reductive nitrogen compound, and optimize the condition.

After determining the amount of injection of reductive nitrogen compound and hydrogen according to the method mentioned in Example 3, alcohol is injected so as to replace the reductive nitrogen compound and alcohol. Its amount is calculated according to the following equation 13:

(Concentration of injected alcohol)=(Molar number of alcohol necessary for reacting with 1 mol of hydrogen peroxide)/(Molar number of reductive nitrogen compound necessary for reacting with 1 mol of hydrogen peroxide)×(Concentration of injected reductive nitrogen compound to be subtracted) (Equation 13)

Figure 16:
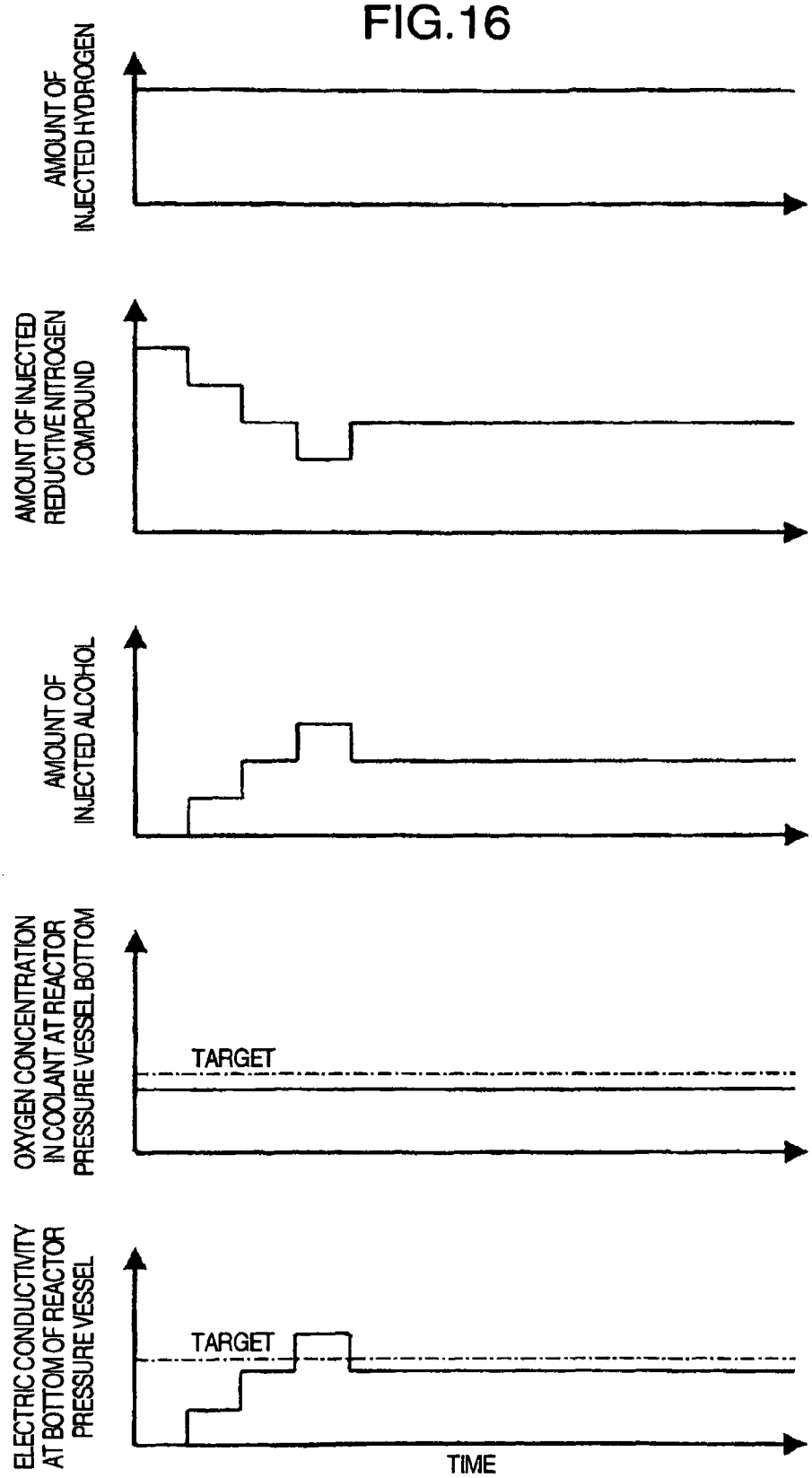
FIG. 16 is the first chart illustrating the method for controlling the amount of injection of reductive nitrogen compound, the amount of injection of alcohol and the amount of injection of hydrogen in Example 4 of this invention.

Concretely saying, it is advisable to replace the reductive nitrogen compound and alcohol stepwise while confirming that the change of electric conductivity of cooling water becomes smaller than the target value, as shown in FIG. 16.

Figure 17:
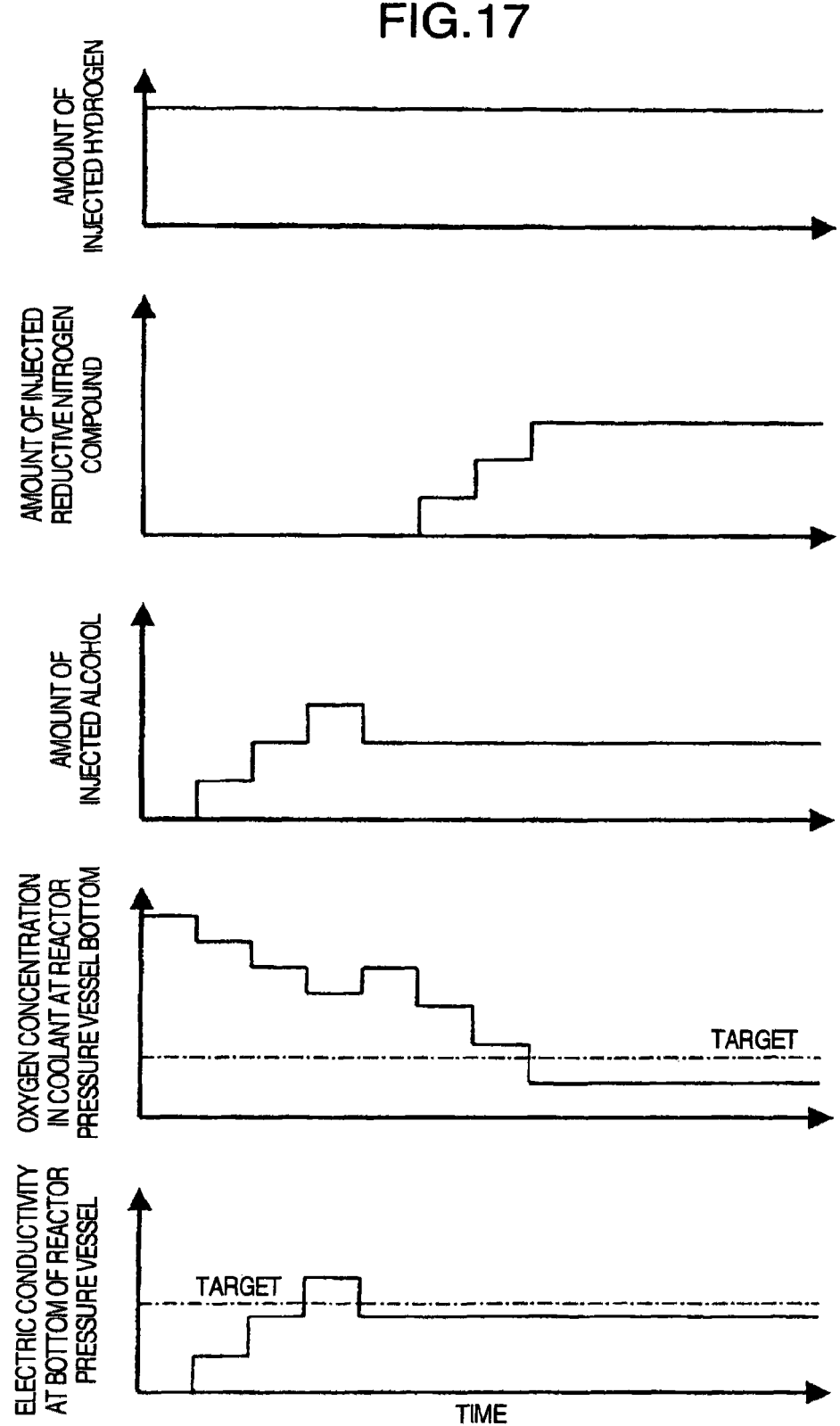
FIG. 17 is the second chart illustrating the method for controlling the amount of injection of reductive nitrogen compound, the amount of injection of alcohol and the amount of injection of hydrogen in Example 4 of this invention.
Figure 18:
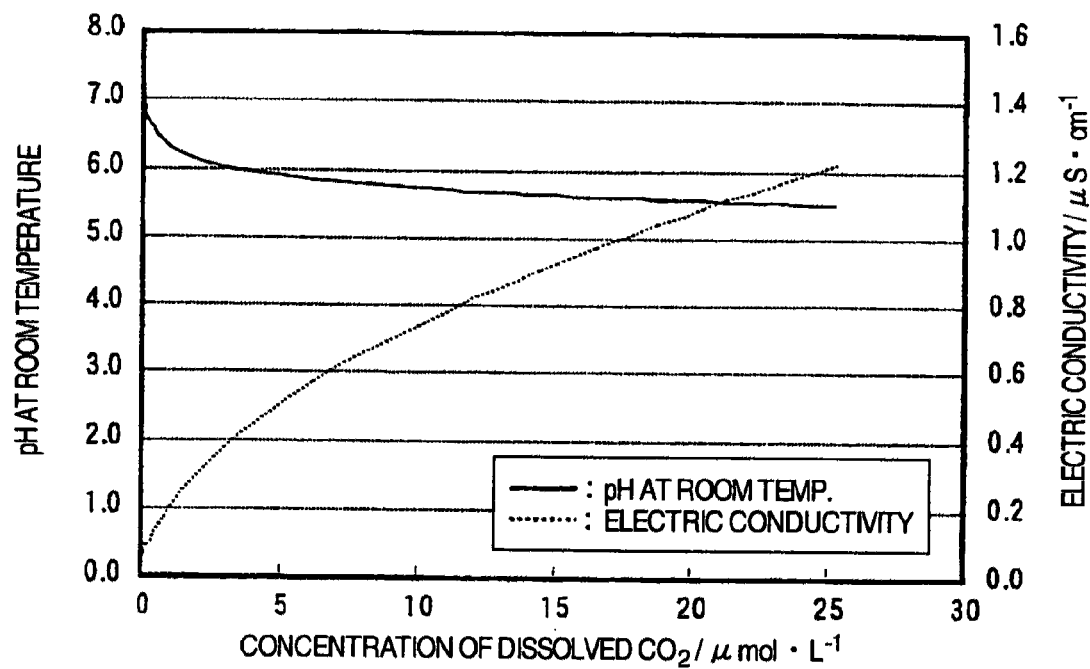
FIG. 18 is a graph illustrating the relations between concentration of dissolved carbon dioxide and pH and electric conductivity.

Otherwise, it is also allowable to determine the amount of alcohol injection giving an electric conductivity smaller than the target value and thereafter to inject the reductive nitrogen compound stepwise, as shown in FIG. 17. The concentration of dissolved CO2 formed from the alcohol can be calculated according to (Equation 7) and (Equation 8). From the relation between dissolved CO2 concentration and pH at room temperature and electric conductivity shown in FIG. 18, the concentration of dissolved CO2 giving an electric conductivity smaller than the target value can be read out. Accordingly, the alcohol concentration giving an electric conductivity not exceeding the target can be determined. However, since there is a possibility that the reductive nitrogen can be consumed prior to the alcohol, it is advisable to confirm the effect by taking the oxygen concentration in the cooling water and ECP of plant-structural material dipped in the cooling water as an indication.

It should be further understood by those skilled in the art that although the foregoing description has been made on embodiments of the invention, the invention is not limited thereto and various changes and modifications may be made without departing from the spirit of the invention and the scope of the appended claims.

EFFECT OF THE INVENTION

According to this invention, a stress corrosion cracking of nuclear power plant structural material can be mitigated without secondary effects such as rise in the cobalt-60 concentration and the like, by injecting a reductive nitrogen compound containing a nitrogen having a negative oxidation number into a reactor water.

What is claimed is:

1. A method for mitigating a stress corrosion cracking of structural material in a nuclear power plant, comprising the step of:
   injecting hydrogen and a reductive nitrogen compound containing nitrogen having a negative oxidation number into a reactor water of a boiling water nuclear power plant; and
   stopping injection of the reductive nitrogen compound when the oxygen concentration reaches a prescribed value,
   wherein said reductive nitrogen compound is injected into the cooling water from at least any one of a system line selected from a group consisting of a reactor water clean up system, a primary loop re-circulation system, an emergency core cooling system and a control rod drive hydraulic system, at a time of start up operation or shut down operation of the reactor, and during a part or all of a period of injecting the hydrogen into the reactor water,
   wherein the injection of said reductive nitrogen compound is stopped when the oxygen concentration in the cooling water has become a prescribed value or less, and
   wherein the injection of said reductive nitrogen compound is controlled so that the concentration of said reductive nitrogen compound in the cooling water comes to $9.4 \times 10^{-6}$ mol/liter or less.

2. The method for mitigating a stress corrosion cracking of structural material in a nuclear power plant according to claim 1, wherein the injection of said reductive nitrogen compound is stopped when the ammonia concentration in the cooling water becomes a prescribed value or more.

3. The method for mitigating a stress corrosion cracking of structural material in a nuclear power plant according to claim 1, wherein said reductive nitrogen compound is injected into the cooling water from at least any one system line selected from the group consisting of a reactor water clean up system, a primary loop re-circulation system, an emergency core cooling system and a control rod drive hydraulic system, at the time of start up operation or shut down operation of the reactor.

4. The method for mitigating a stress corrosion cracking of structural material in a nuclear power plant according to claim 3, wherein a site of the injection of said reductive nitrogen compound from the reactor water clean up system line is at least one injection connection selected from the group consisting of an injection connection provided on a line connecting the down stream of the filter demineralizer and the reactor pressure vessel and an injection connection provided on the line connecting the down stream of the connection part in the reactor water clean up system line of the sampling line provided for the purpose of measuring water quality at the outlet of filter demineralizer and the reactor pressure vessel.

5. The method for mitigating a stress corrosion cracking of structural material in a nuclear power plant according to claim 1, wherein said reductive nitrogen compound is at least any one compound selected from the group consisting of hydroxylamine, carbohydrazide, hydrazine, ammonia and diazine.

* * * * *